(12) United States Patent
Bhamidipaty et al.

(10) Patent No.: US 9,229,685 B2
(45) Date of Patent: *Jan. 5, 2016

(54) AUTOMATED CORRUPTION ANALYSIS OF SERVICE DESIGNS

(75) Inventors: Anuradha Bhamidipaty, Bangalore (IN); Alan Hartman, Haifa (IL); Anshu Narendra Jain, Karnataka (IN); Nidhi Rajshree, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,320

(22) Filed: Aug. 30, 2012

(65) Prior Publication Data

US 2013/0198149 A1    Aug. 1, 2013

Related U.S. Application Data

(63) Continuation of application No. 13/361,675, filed on Jan. 30, 2012.

(51) Int. Cl.
*G06F 7/00* (2006.01)
*G06Q 50/26* (2012.01)
(52) U.S. Cl.
CPC . *G06F 7/00* (2013.01); *G06Q 50/26* (2013.01)
(58) Field of Classification Search
CPC .................................................. G06Q 10/0635
USPC .......................................................... 707/694
See application file for complete search history.

(56) References Cited

U.S. PATENT DOCUMENTS

| | | | |
|---|---|---|---|
| 2002/0138316 A1* | 9/2002 | Katz et al. | 705/7 |
| 2002/0138407 A1* | 9/2002 | Lawrence et al. | 705/38 |
| 2007/0067206 A1* | 3/2007 | Haggerty et al. | 705/10 |
| 2008/0152122 A1* | 6/2008 | Idan et al. | 379/265.07 |
| 2008/0281765 A1* | 11/2008 | Schiffer | 706/12 |
| 2009/0144095 A1* | 6/2009 | Shahi et al. | 705/4 |
| 2009/0292739 A1* | 11/2009 | Marsh et al. | 707/200 |
| 2010/0114634 A1* | 5/2010 | Christiansen et al. | 705/7 |
| 2010/0299323 A1* | 11/2010 | Crook | 707/723 |
| 2012/0310700 A1* | 12/2012 | Kurtz et al. | 705/7.28 |

OTHER PUBLICATIONS

Anwar Shah, Performance Accountability and Combating Corruption, 2007, The Internation Bank for Reconstruction and Development/The World Bank, pp. 71-72.*

(Continued)

*Primary Examiner* — Jorge A Casanova
(74) *Attorney, Agent, or Firm* — Ference & Associates LLC

(57) ABSTRACT

Methods and arrangements for conducting corruption analysis of service designs. A service design is accepted. Corrupting factors within the service design are assessed, and a corruption susceptibility score is generated. An alternative service design is generated responsive to a corruption susceptibility score fulfilling predetermined criteria.

9 Claims, 3 Drawing Sheets

(56) References Cited

OTHER PUBLICATIONS

Spector et al., Corruption Assesment Handbook, 2006, USAID, pp. 1-180.*

Andvig, J. C., et al., "Corruption A Review of Contemporary Research", Report R 2001:7, 130 pages, Chr. Michelsen Institute 2001, Bergen, Norway.

UNDP, Transparency International, "Corruption and Governance Measurement Tools in Latin American countries", United National Development Program, Apr. 2006, 75 pages, Brussels, Belgium.

Iacobuta, Andreea-Oana, et al, "An analysis of the Romanian bureaucracy and corruption," International Journal of Business Research, Mar. 1, 2009, 9 pages, vol. 9, Issue 2, International Academy of Business and Economics.

* cited by examiner

AUTOMATED CORRUPTION ANALYSIS OF SERVICE DESIGNS

CROSS REFERENCE TO RELATED APPLICATION

This application is a continuation of U.S. patent application Ser. No. 13/361,675, entitled AUTOMATED CORRUPTION ANALYSIS OF SERVICE DESIGNS, filed on Jan. 30, 2012, which is incorporated by reference in its entirety.

BACKGROUND

In the realm of human-provided services, corruption often emerges as a major issue to be dealt with, especially in the realm of public services. Systemic deficiencies such as lack of transparency, deficit of information, weak accounting practices and obsolete policies, among other deficiencies, have been known to lend themselves to an environment which breeds different forms of corruption.

Several conventional tools and methods are available for assessing deficiencies that result in corruption, but are found to be lacking in any of several respects. Subjective tools assess corruption through opinion surveys and thus are highly susceptible to a surveyee's personal bias. Reactive tools involve assessments performed subsequent to known acts of corruption and at best serve a corrective, rather than preventative, purpose. Some tools conduct assessments based on institutional diagnostics such as audits and focus mainly on loopholes on an administrative side. Thus, corruption taking place on the side of beneficiaries may well go undetected, rampant as it may be in a particular case. Generally, conventional methods such as those just described are mainly performed manually, with a general lack of reliability thereby implied.

BRIEF SUMMARY

In summary, one aspect of the invention provides a method comprising: accepting a service design; assessing corrupting factors within the service design; generating a corruption susceptibility score; and generating an alternative service design responsive to a corruption susceptibility score fulfilling predetermined criteria.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
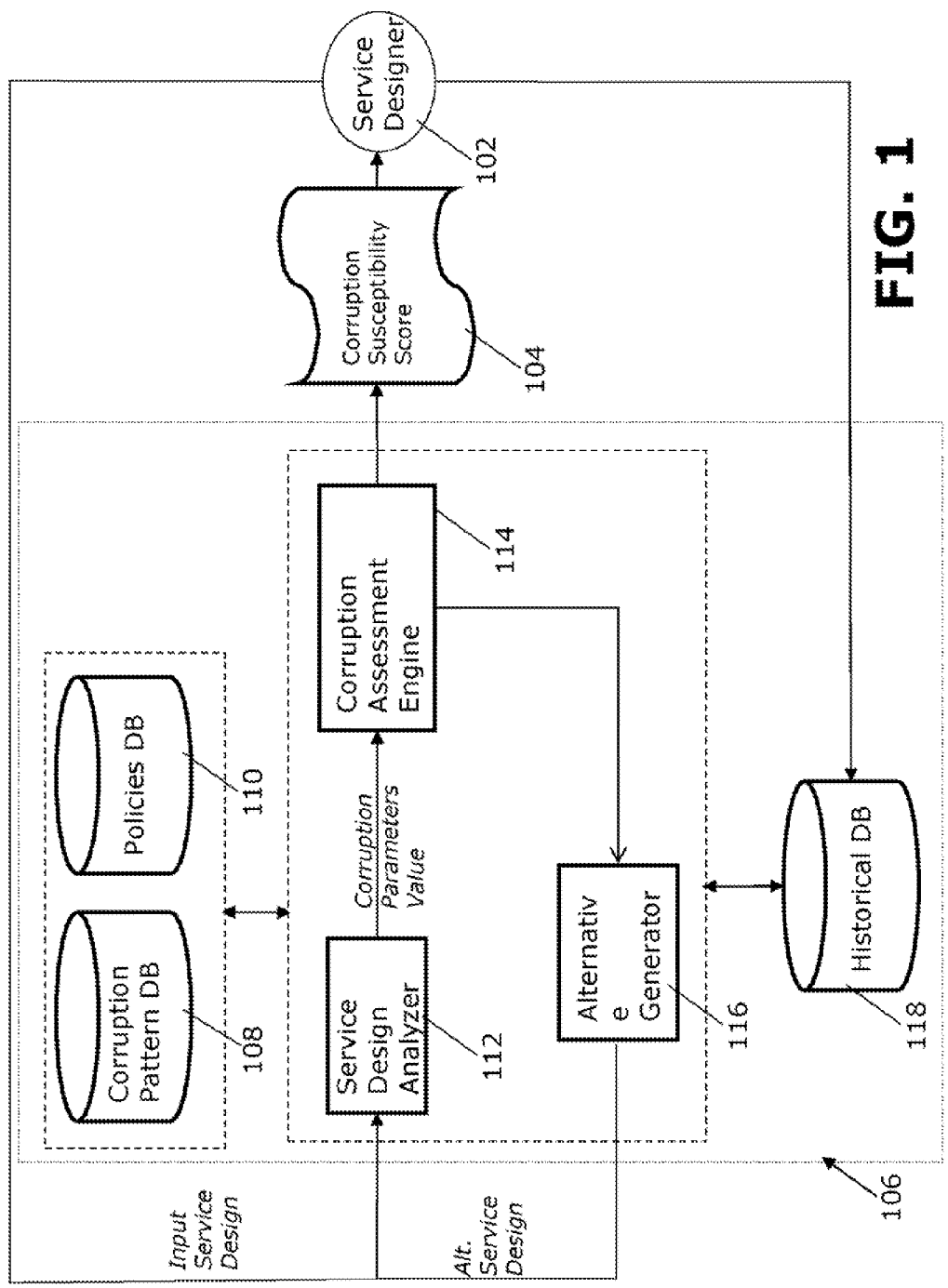
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIG. 1. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are systems and frameworks which can systematically analyze formal service designs based on predefined rules and patterns to identify the corruption loopholes within a service and accordingly assign a corruptibility score (which can also be referred to as a corruption susceptibility score) to the design. The service designs are expressed formally as business process workflows and design elements based on a service ontology and forms the basis of defining rules for detection of corruption patterns. The service design ontology augments the standard service ontology with a corruption profile.

In accordance with at least one embodiment of the invention, and as schematically illustrated in FIG. 1, an input service design is inspected to look for pre-defined corruption patterns and to detect, proactively, corruption-based loopholes. Design alternatives are thereupon proposed by the system by way of eliminating the loopholes and thus making the design less corruption-prone.

In accordance with at least one embodiment of the invention, input is received as an initial service design, from an individual service designer 102, based on a formal service ontology and business process workflow that needs to be assessed for corruption. Provided as output, then, is a corruption susceptibility score 104 that indicates a level of corruptibility of the input service design.

In accordance with at least one embodiment of the invention, a corruption assessment framework 106 includes several components. A corruption pattern database 108 stores all identified corruption patterns in a well defined structured format. A policy database 110 stores all the government policies and legal rules applicable to public services. It should be understood and appreciated that public services are presented herein by way of an illustrative and non-restrictive example. In accordance with embodiments of the invention, policies or rules applicable to other types of services can be stored and employed. A service design analyzer 112 then analyzes the input service design based on the design elements of interest obtained from all the corruption patterns and applicable policies. A corruption assessment engine 114, for its part, is configured to comprehend the enhanced service design ontology. Based on the values extracted for different design elements and the rules obtained from the corruption patterns and applicable policies, it identifies the patterns exhibited by the input service design. It then assigns a corruption susceptibility score 104 to the input service design.

In accordance with at least one embodiment of the invention, an alternative generator 116, based on a threshold defined for corruption susceptibility score, triggers the generation of at least one alternative service design. Such alternatives can also incorporate learning from prior corrective measures stored in a historical database 118, which stores the historical data that represent the corrective measures previously taken to improve the corruption susceptibility score 104. Alternative generator 116 also consults the corruption pattern database 108 to develop a solution to be applied to matched patterns. An alternative service design then itself gets analyzed by analyzer 112 to ensure or verify compliance with corruption resolution measures. Corrective measures can then be accepted by the service designer 102 to make any design more robust. An individual serving as a service designer 102 may also suggest feedback to the existing policies and identified corruption patterns based on these alternatives.

In accordance with at least one embodiment of the invention, framework 106 can execute its tasks automatically or with manual intervention. Particularly, in one variant, the framework 106 can automatically run rules on the input service design to match the corruption patterns and calculate the degree of corruptibility in the design (via the corruption susceptibility score). In another variant, the framework 106 can semi-automatically run the rules on the input service design supervised by a human, to thereby match the corruption patterns and calculate the degree of corruptibility in the design (via the corruption susceptibility score).

Numerous examples abound for applying embodiments of the invention. In one illustrative working example, there may be a need to define clear and appropriate eligibility criteria for identifying entitled beneficiaries of a public (or other) service. A corruption assessment framework 106 can be used, then, when a targeted section of the population enjoys the benefits of a public (or other) service, administered targeting rather than self-targeting is used for categorizing and identification criteria are weak (i.e., are not verifiable and subject to multiple interpretations). The impetus here may well be that inaccurate eligibility criteria can be plagued by errors of both inclusion and exclusion, i.e., exclusion of citizens righteously entitled to avail the service and inclusion of those who are not.

In accordance with the above-stated working example, one factor in a corruption susceptibility score 104 can be that a targeted section of the population enjoys the benefits of the public (or other) service. This value can be 1. Another factor can be that administered targeting, rather than self-targeting is used for categorizing. This value, likewise, can be 1. Finally, another metric can arise from the strength of identification criteria. Particularly, if criteria are not verifiable and subject to multiple interpretations, specific criteria can be assessed (e.g., land holdings, food security and sanitation, among others) with a determination as to what proportion of the criteria are weak and difficult to verify. By way of an illustrative example, criteria that include 0-5% with a definition of "weak" can yield a factor of 0, a showing of 5-30% weak criteria can yield 2, and then values of 4, 6 and 8 can be yielded for the ranges of 30-50%, 50%-70% and 70%-100% of weak criteria, respectively. If, in accordance with an illustrative example, the value yielded in this step is 6, then the total corruption susceptibility score will be 8 (based on all three considered factors).

In accordance with at least one embodiment of the invention, a corruption susceptibility score can be employed to determine suggestions for improvement in the allocation of services or benefits involved.

Figure 2:
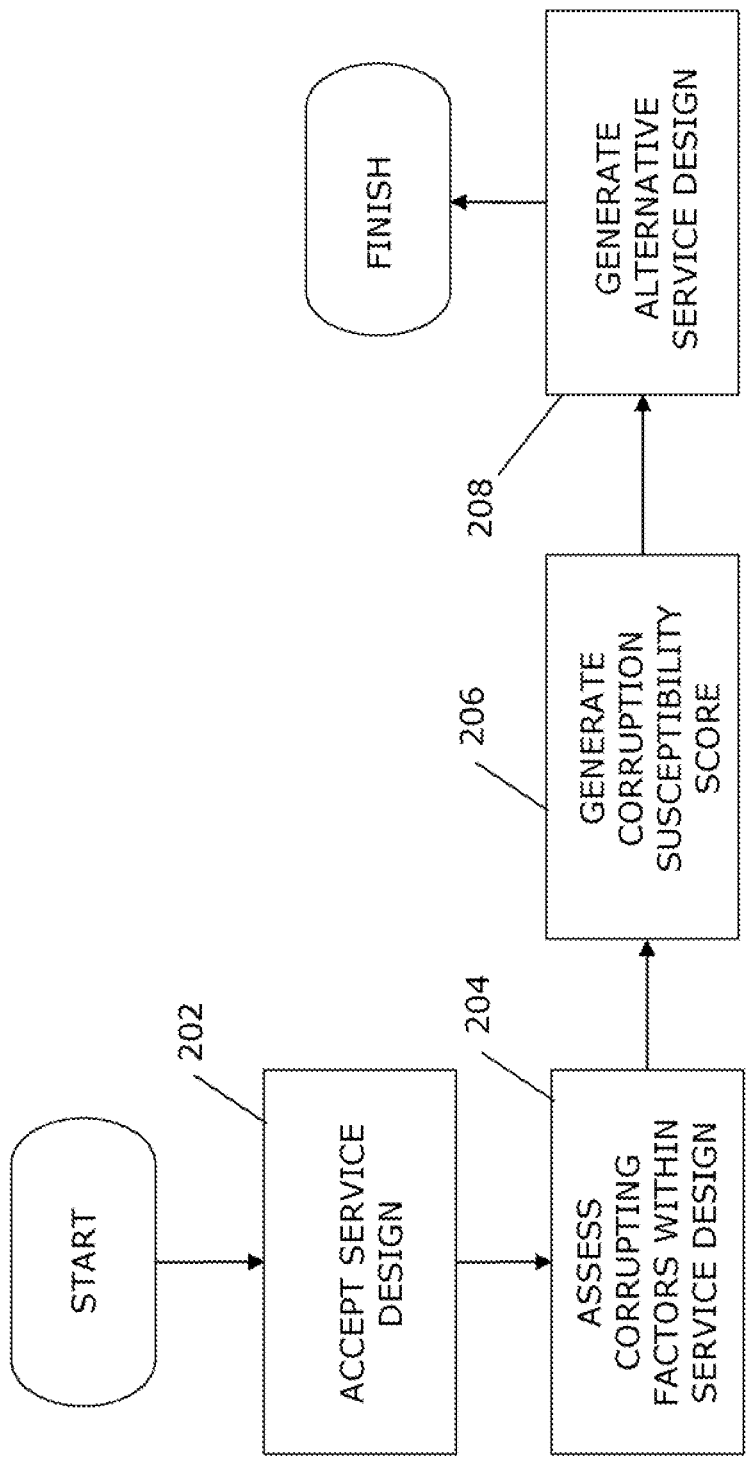
FIG. 2 sets forth a process more generally for conducting corruption analysis of service designs.

FIG. 2 sets forth a process more generally for conducting corruption analysis of service designs, in accordance with at least one embodiment of the invention. It should be appreciated that a process such as that broadly illustrated in FIG. 2 can be carried out on essentially any suitable computer system or set of computer systems, which may, by way of an illustrative and on-restrictive example, include a system such as that indicated at 12' in FIG. 3. In accordance with an example embodiment, most if not all of the process steps discussed with respect to FIG. 2 can be performed by way a processing unit or units and system memory such as those indicated, respectively, at 16' and 28' in FIG. 3.

As shown in FIG. 2, a service design is accepted (202). Corrupting factors within the service design are assessed (204), and a corruption susceptibility score is generated (206). An alternative service design is generated responsive to a corruption susceptibility score fulfilling predetermined criteria (208).

Figure 3:
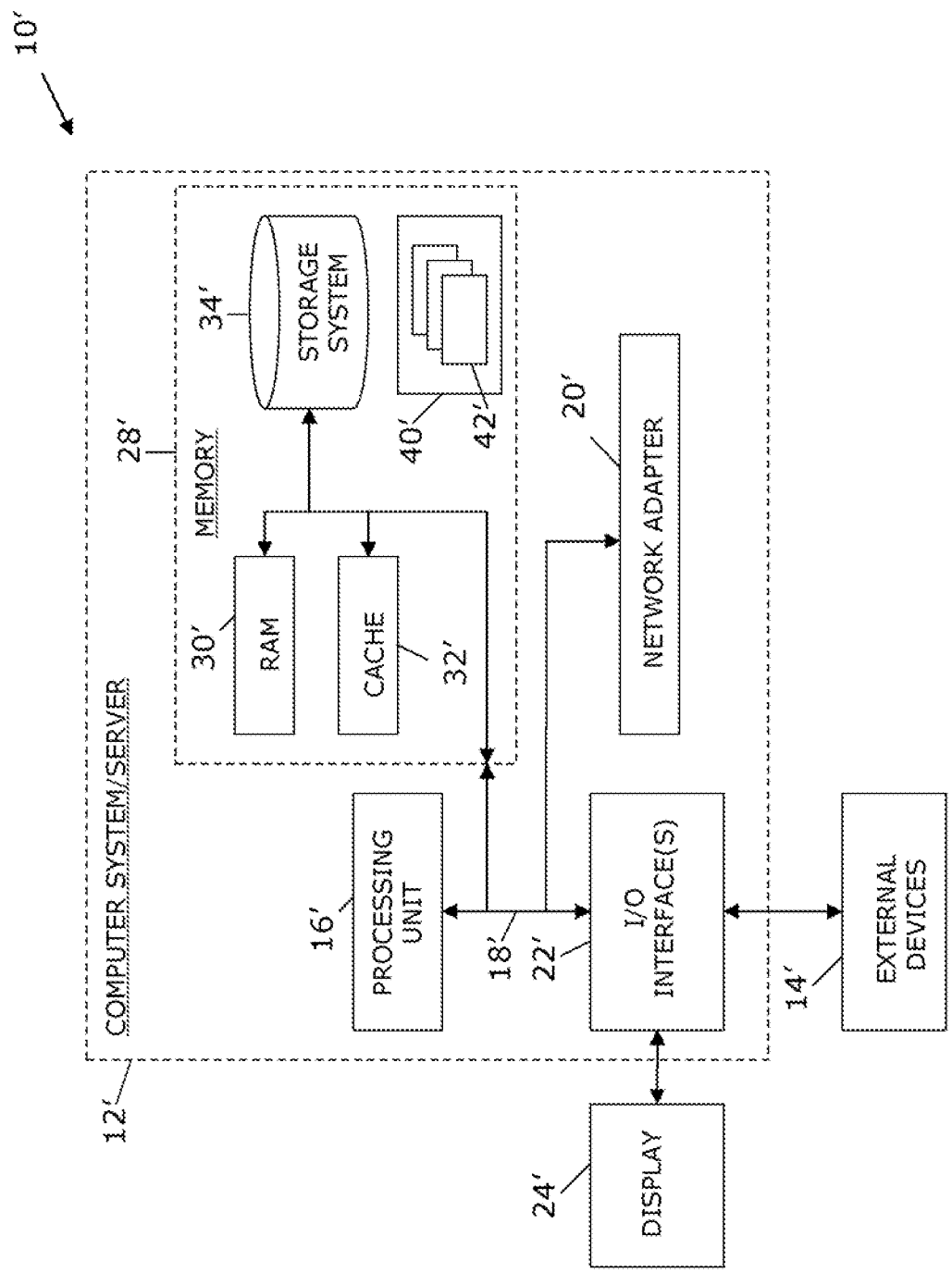
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
accepting a service design related to at least one human-provided service, wherein the service design is expressed formally as a business process workflow, and design elements based on a service ontology;
automatically assessing human-related corrupting factors within the service design via consulting a corruption pattern database which stores pre-defined corruption patterns in structured format, and inspecting the service design for pre-defined corruption patterns from the database;
automatically generating a corruption susceptibility score based on the assessed corrupting factors, the corruption susceptibility score indicating a level of human-related corruptibility in the service design;
the corruption susceptibility score being a function of at least a quantitative component relating to verifiability of identification criteria; and
automatically generating an alternative service design, wherein said generating is triggered based on a threshold corruption susceptibility score.

2. The method according to claim 1, further comprising developing corrective suggestions for developing subsequent service designs.

3. The method according to claim 1, wherein said generating of an alternative service design comprises consulting a historical database to incorporate learning from prior corrective measures stored in the historical database.

4. The method according to claim 3, wherein said consulting comprises accessing service design components contributing to a compliant corruption susceptibility score.

5. The method according to claim 3, wherein said generating of an alternative service design further comprises consulting the corruption pattern database.

6. The method according to claim 1, wherein said generating of an alternative service design comprises consulting the corruption pattern database.

7. The method according to claim 1, wherein said assessing comprises consulting a policy database.

8. The method according to claim 1, wherein the corruption susceptibility score includes a component of categorizing beneficiaries of a service.

9. The method according to claim 1, wherein the corruption susceptibility score includes a component of categorizing a mode of targeting a service to beneficiaries.

* * * * *